United States Patent
Hulings et al.

(10) Patent No.: US 6,553,653 B2
(45) Date of Patent: Apr. 29, 2003

(54) VERTICAL ASSEMBLY TABLE

(75) Inventors: James E. Hulings, Zelienople, PA (US); Richard D. Spotts, Renfrew, PA (US)

(73) Assignee: Billco Manufacturing, Inc., Zelienople, PA (US)

( * ) Notice: Subject to any disclaimer, the term of this patent is extended or adjusted under 35 U.S.C. 154(b) by 96 days.

(21) Appl. No.: 09/886,396

(22) Filed: Jun. 20, 2001

(65) Prior Publication Data

US 2002/0020054 A1 Feb. 21, 2002

Related U.S. Application Data

(60) Provisional application No. 60/213,691, filed on Jun. 23, 2000.

(51) Int. Cl.$^7$ ................................................ B25B 11/00
(52) U.S. Cl. .......................... 29/712; 29/714; 29/281.5; 29/407.1; 29/464; 29/559; 269/239
(58) Field of Search ............................. 29/407.1, 468, 29/407.69, 464, 559, 709, 712, 714, 281.1, 281.4, 430, 772, 281.3, 281.5; 269/239; 211/41.14; 198/861.3

(56) References Cited

U.S. PATENT DOCUMENTS

| | | | |
|---|---|---|---|
| 3,122,118 A | 2/1964 | Cooper | 113/99 |
| 3,128,736 A | 4/1964 | Norris et al. | 113/102 |
| 4,014,733 A | 3/1977 | Loubet | 156/446 |
| 4,189,818 A | * 2/1980 | Lavoisey | 29/281.5 |
| 4,434,024 A | * 2/1984 | Lisec | 29/714 |
| 4,492,016 A | 1/1985 | Smets et al. | 29/432 |
| 4,495,023 A | 1/1985 | Lisec | 156/562 |
| 4,623,083 A | 11/1986 | Pagano | 227/152 |
| 4,829,651 A | 5/1989 | Shirai | 29/430 |
| 4,988,027 A | 1/1991 | Bremner | 225/2 |

OTHER PUBLICATIONS

Glass Equipment Development, Inc. Advertisement for "Assembly Tables, Type SAT–PHE".

* cited by examiner

Primary Examiner—Gregory M. Vidovich
Assistant Examiner—Jermie E. Cozart
(74) Attorney, Agent, or Firm—Webb Ziesenheim Logsdon Orkin & Hanson, P.C.

(57) ABSTRACT

A vertical assembly table is designed to automatically assemble an insulated glass window structure consisting of two identical glass lites and an edge seal. The seal is added to one glass lite after washing, but prior to conveying to the vertical assembly table. The vertical assembly table includes two independent conveyor tables, each having a plurality of conveyor rolls. A pivotable subframe is associated with each roller table, with each subframe having a plurality of support arms coupled to a common pivot shaft. Each support arm is positioned between the rolls of the associated roller table. Each subframe is moved between a retracted position below a pass line of the roller table and a transfer position adjacent the other subframe in the transfer position. A transfer mechanism is provided for transferring a glass workpiece from one subframe to the adjacent subframe when the subframes are in the transfer position. Following the transfer of one glass workpiece to the adjacent subframe, the subframes are lowered to the retracted position to position the now assembled window structure onto one respective roller table for conveying and subsequent processing.

9 Claims, 10 Drawing Sheets

VERTICAL ASSEMBLY TABLE

CROSS-REFERENCE TO RELATED APPLICATION

This application claims the benefit of U.S. Provisional Patent Application Serial No. 60/213,691, filed Jun. 23, 2000 entitled "Vertical Assembly Table".

BACKGROUND OF THE INVENTION

1. Field of the Invention

The present invention relates to a vertical assembly table for assembling composite structures, in particular, for assembling glass window structures.

2. Background Information

Assembly tables which tilt to reposition a workpiece are well-known in various arts. For example, U.S. Pat. No. 4,829,651 to Shirai discloses a tilting table for the manufacture of panels forming walls, roofs and floors. U.S. Pat. No. 4,492,016 to Smets et al. discloses a tilting assembly table for pallets and the like. Additionally, U.S. Pat. No. 4,623,083 to Pagano discloses a pivotable assembly table having two pivotable portions for forming a board fence section. The pair of pivotable table sections is sometimes referred to as a "butterfly table" due to the dual pivoting arrangement.

Assembly tables have been created for automatically assembling insulated glass window structures in the form of butterfly tables. An insulated glass window assembly generally consists of two identical glass workpieces or glass lites with an edge seal, such as a swiggle. The glass seal is added to one glass lite after washing, but before conveying to the vertical assembly table. A typical vertical assembly butterfly table is produced by Glass Equipment Development, Incorporated and designed for automatic operation. The table automatically feeds glass lites in, aligns pairs of glass lites, then assembles a window structure.

One disadvantage of prior art butterfly tables is that the pivoting structure incorporates the entire conveying assembly. This significantly increases the weight of the portion being pivoted and the associated costs, design and complexity of the pivoting structure. For example, the drive system of the conveyor must accommodate the pivoting conveyor. Additionally, these factors work to increase the cycle time of the resulting table.

SUMMARY OF THE INVENTION

It is an object of the present invention to overcome the problems with the aforementioned prior art. It is another object of the present invention to design an efficient, cost-effective vertical assembly table designed to automatically assemble insulated glass window structures. These objects are achieved by a vertical assembly table according to the present invention.

The assembly table comprises two adjacent roller conveyor tables having a plurality of spaced rollers thereon. The roller tables receive the glass lites to be assembled. The glass lites proceed down the table until they hit an appropriate stop. Separate pivoting subframes, each comprised of a plurality of lift arms positioned between the rollers of one roller table lift the two glass lites to be assembled away from the respective roller tables toward each other. The glass lites are moved into alignment with each other. One pivoting subframe includes pivotable alignment or abutment arms which will support both glass lites on a common structure simultaneously. The other pivoting subframe includes a pushover assembly for pivoting one glass lite completely onto the other subframe. Following transfer, the subframes will lower, with one subframe now lowering the assembled glass structure onto one of the two roller tables completing the assembly process. The process can now be repeated for the next cycle.

In one embodiment of the present invention, the vertical assembly table includes two independent DC servo driven roller conveyors each associated with a tilting subframe having a plurality of lift arms. A pair of air cylinders are used with each subframe lifting assembly to lift the respective set of arms via a common pivot shaft. The glass lite with the seal and the glass lite without the seal are conveyed separately under DC servo control into the assembly area of the table. Both lites are squared and placed into precise alignment by a sequence of pneumatically operated squaring stops while being lifted in a vertical, folding orientation. Bottom edge and lead edge squaring stops are used to initially make the two sheets parallel and the edges square. In one embodiment of the present invention, a second lead edge squaring stop located near the middle of the table may be provided for double lite operation on the table. Separate lites are assembled in a vertical orientation with the top edges mating first. Arms of the pushover assembly are used to assist the final assembly by pushing the non-spacer lite against the seal of the spacer lite. The non-spacer lite is preferably loaded onto lift arms having the pushover assembly so that it is the non-spacer lite being pivoted into position.

The conveyor system of the present invention may utilize chain driven donut rolls. Photoelectric sensors are used to notify the program logic controller (PLC) of the glass lite location during a process. The sensors may be located at the entrance, center and exit of both conveyors. Additionally, inductive proximity switches may be used to detect the mechanical completion of motions of the subframes in the process cycle.

These and other advantages of the present invention will be clarified in the description of the preferred embodiments taken together with the figures wherein like reference numerals represent like elements throughout.

DETAILED DESCRIPTION OF THE PREFERRED EMBODIMENTS

Figure 1:
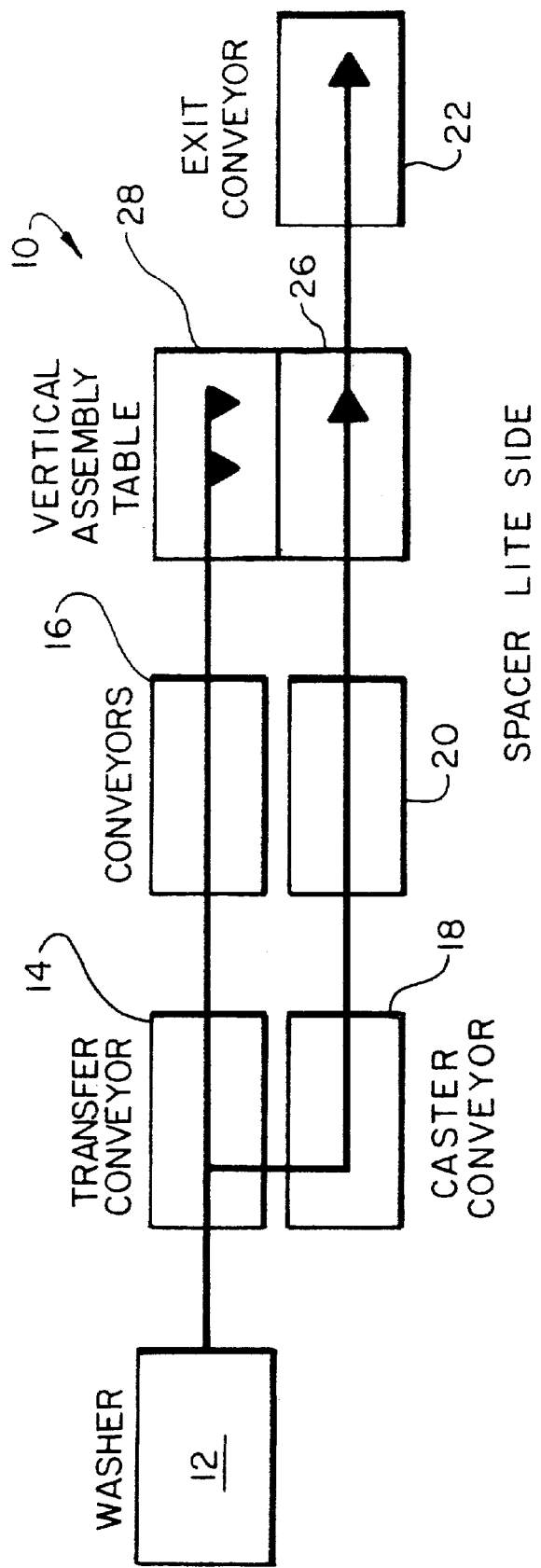
FIG. 1 schematically illustrates a simplified system layout incorporating the vertical assembly table according to the present invention.

FIG. 1 illustrates a schematic of a simplified system layout incorporating a vertical assembly table 10 of the present invention. The layout in FIG. 1 is for descriptive purposes only and is not intended to represent any specific system arrangement. The vertical assembly table 10 of the present invention is designed to automatically assemble an insulated glass window structure consisting of two identical glass lites (also known as glass workpieces) and an edge seal (also known as a spacer), such as a swiggle. The glass workpieces or glass lites will proceed through a washer 12. The seal is added to one glass lite of the glass window structure after washing in the washer 12, but prior to transportation to the vertical assembly table 10. Following the washer 12, the glass lites are separated into two processing lines at a transfer conveyor 14. At the transfer conveyor 14, the glass lites which are not receiving the seal or spacer are transferred to a conveyor 16 on the non-spacer lite side. The glass lites receiving the seal or spacer are transferred to a castor conveyor 18 on the spacer lite side shown in FIG. 1. From the castor conveyor 18, the glass lite receiving the seal is transferred to a conveyor 20 and then onto the vertical assembly table 10. As discussed above, prior to being transferred to the vertical assembly table 10, the seal is added to one of the glass lites between the washer 12 and the vertical assembly 10. The conveyor 16 will transfer the glass lite not receiving the seal to the vertical assembly table 10. The vertical assembly table 10 receives and aligns the identical glass lites and edge seal and combines them in the manner described below. The assembled glass window structure is transferred from the vertical assembly table 10 to an exit conveyor 22 for subsequent processing as known in the art.

Figure 2:
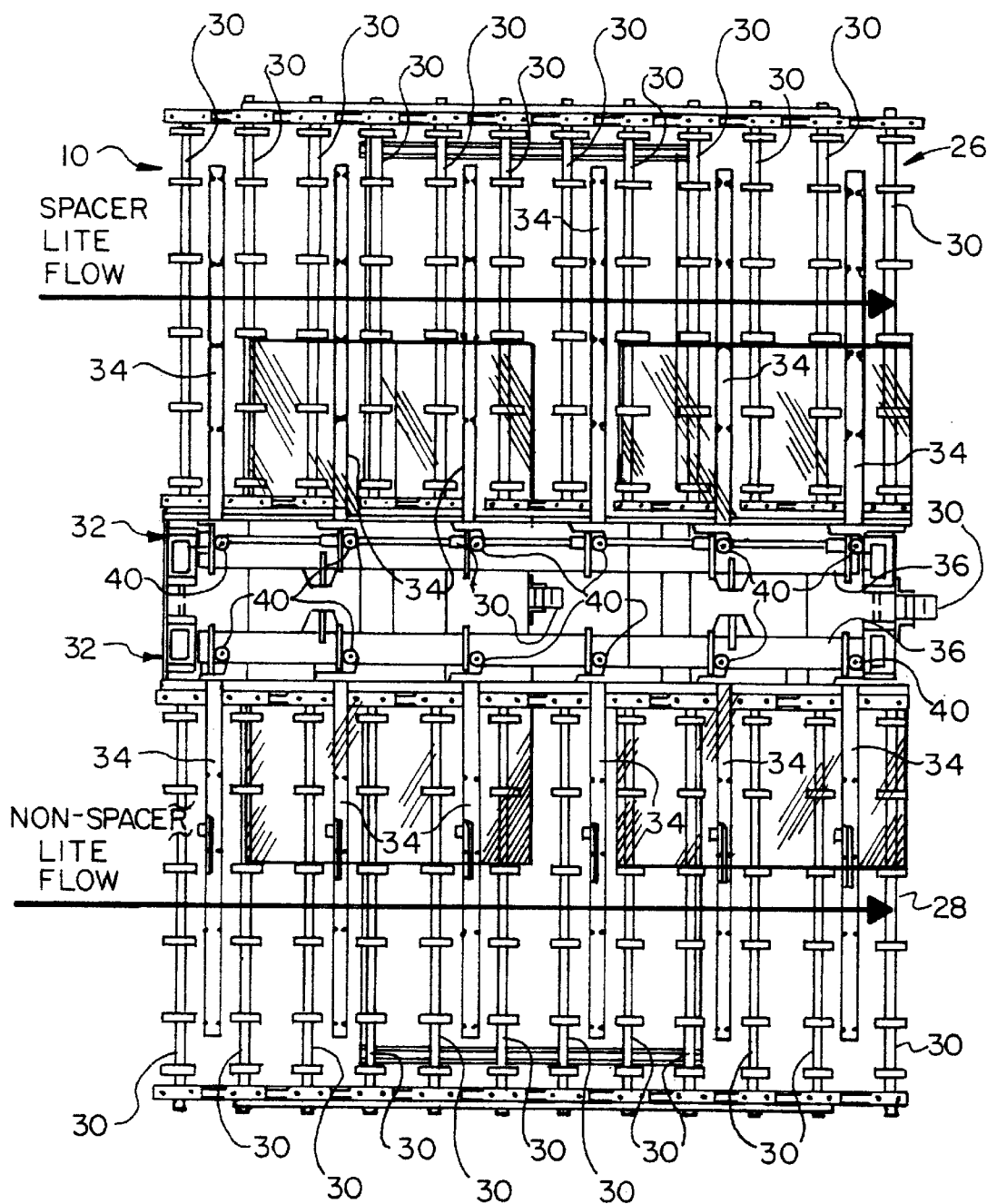
FIG. 2 is a schematic plan view of a vertical assembly table according to the present invention.

FIG. 2 is a schematic plan view of the vertical assembly table 10 according to the present invention. The vertical assembly table 10 includes two independent, DC motor driven conveyor roller tables 26 and 28. The roller table 26 is positioned on the spacer lite side and the roller table 28 is positioned on the non-spacer lite side. The spacer lite side and non-spacer lite side are reversed in FIG. 2 from those shown in FIG. 1 to illustrate the interchangeability of the sides. The roller tables 26 and 28 are substantially identical with the differences between the spacer lite side and the non-spacer lite side being reflected in the glass lite transfer mechanism to be described hereinafter.

Each roller table 26, 28 includes a plurality of spaced, chain driven rolls 30. The rolls 30 includes a plurality of spaced workpiece supporting donuts as known in the art. The details of the drive system for the roller tables 26 and the construction of the rolls 30 are believed to be well-known in the art and are not shown or described in detail.

Figure 3:
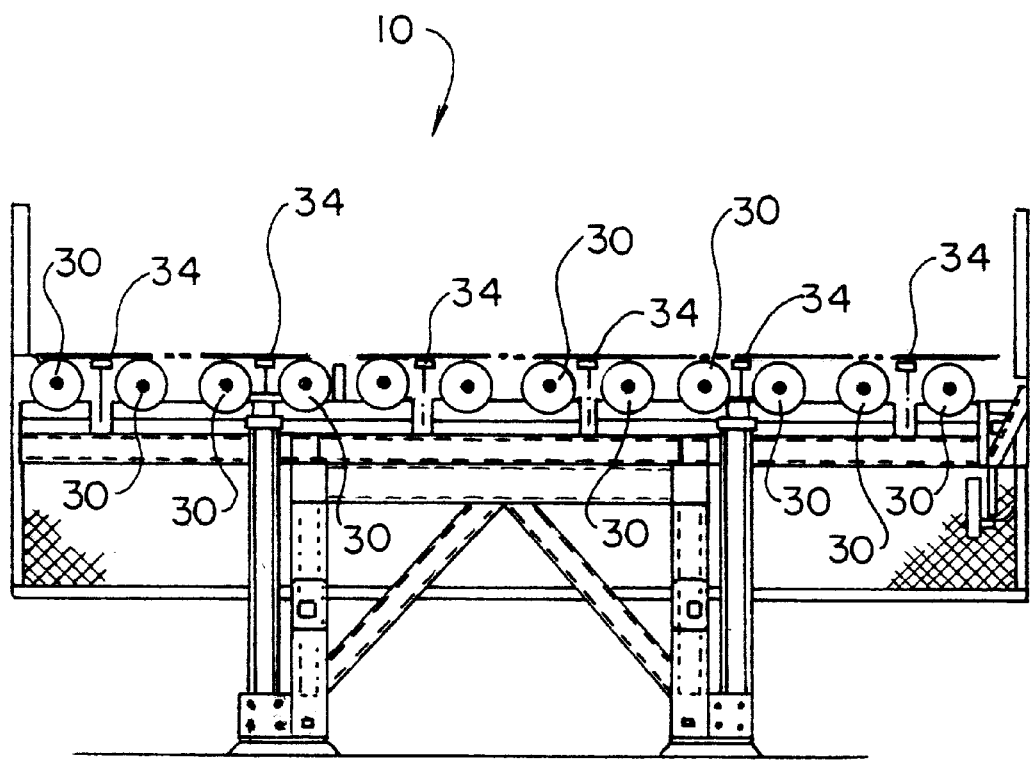
FIG. 3 is an elevational side view partially in section of the vertical assembly table illustrated in FIG. 2.
Figure 4:
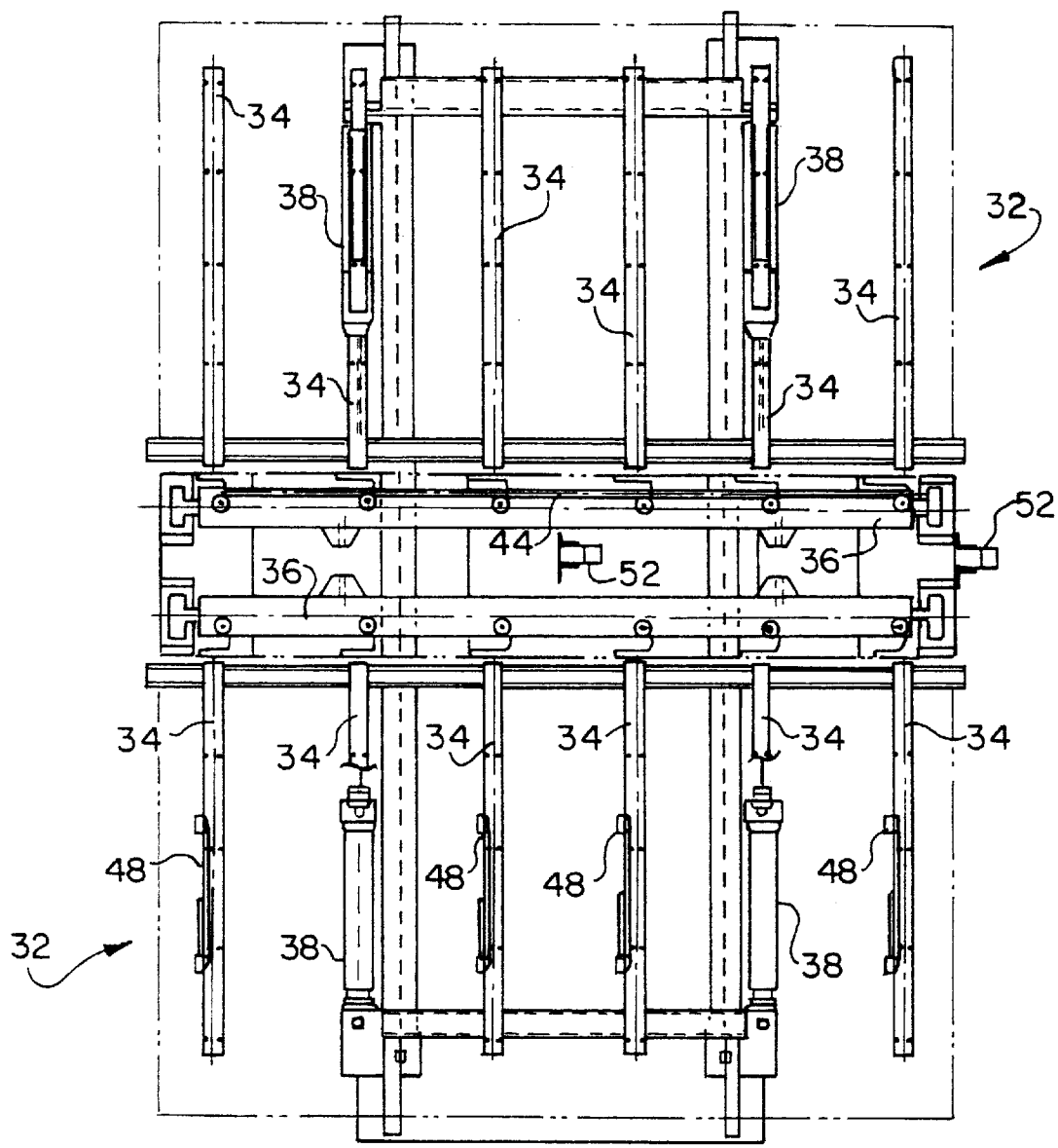
FIG. 4 is a plan view partially in section of the lifting subframes of the vertical assembly table illustrated in FIG. 2.
Figure 5:
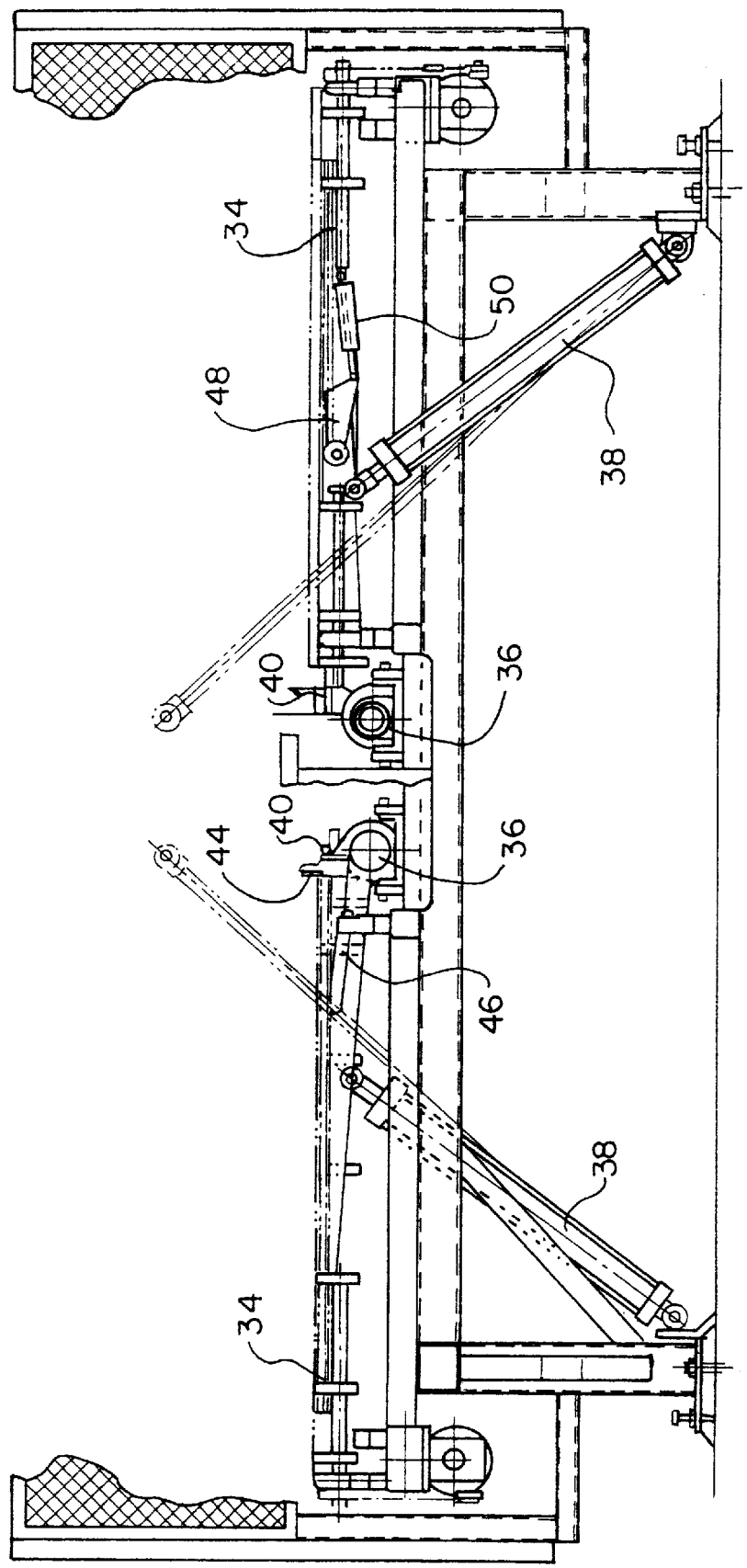
FIG. 5 is an elevational end view of the subframes illustrated in FIG. 4.
Figure 6:
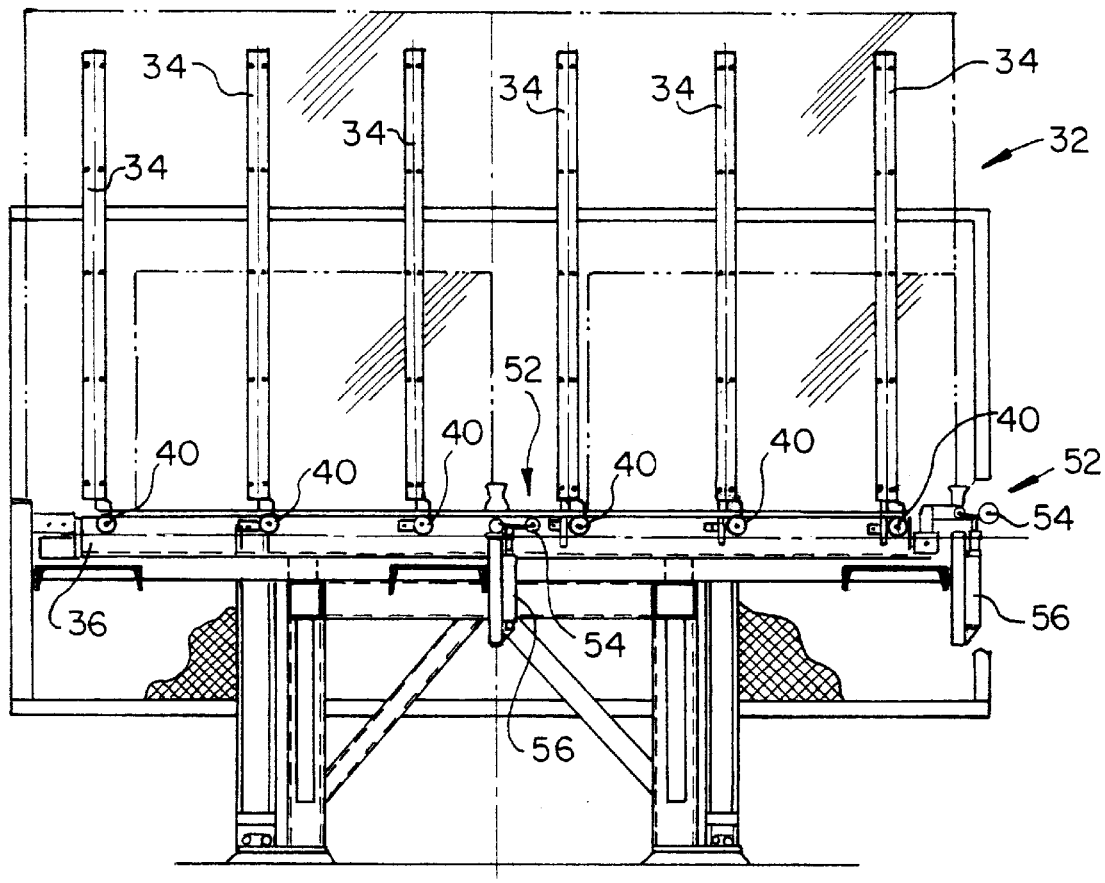
FIG. 6 is an elevational side view of the subframes illustrated in FIG. 4, with the subframe in the raised position.
Figure 7:
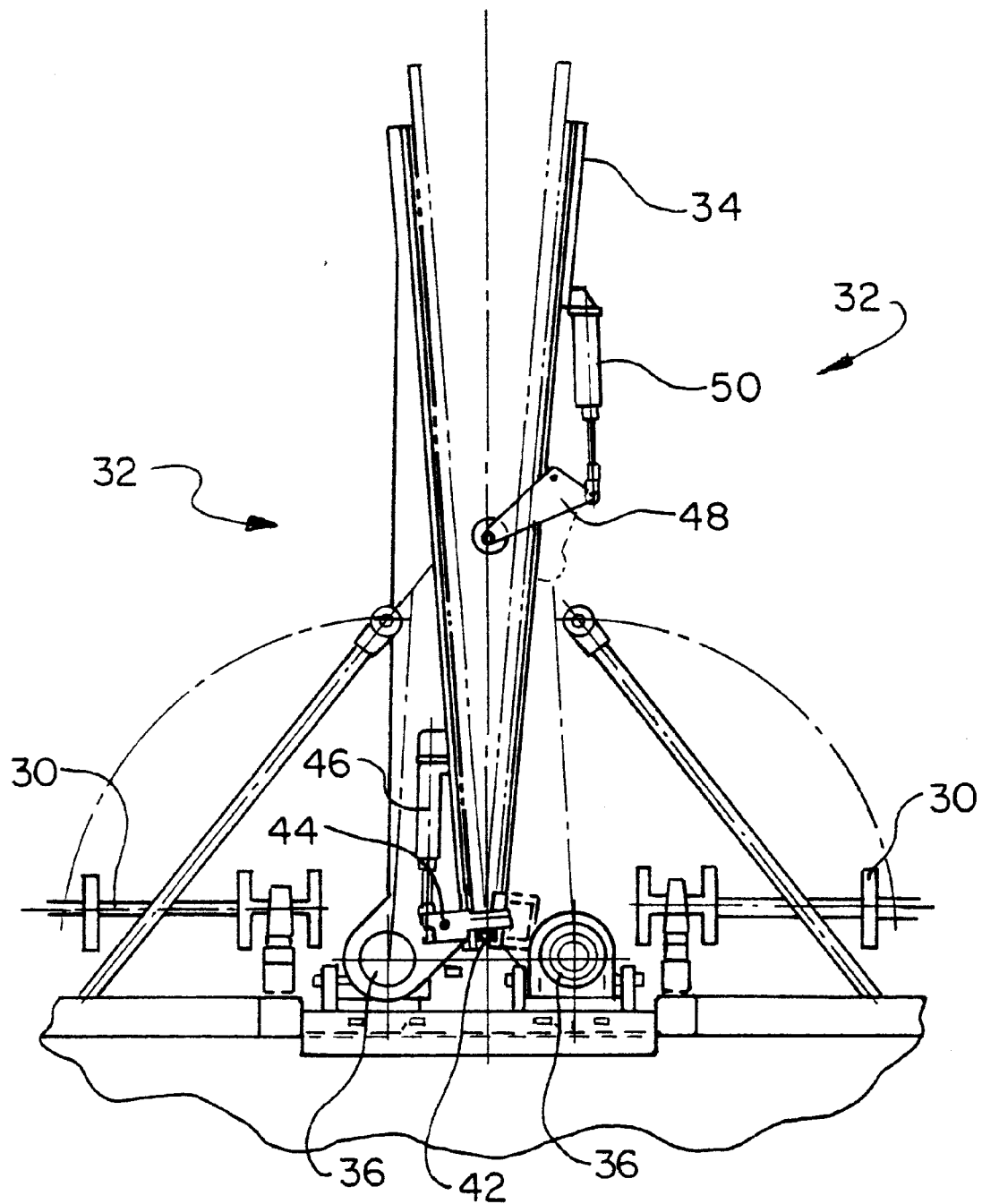
FIG. 7 is an elevational end view of the subframe of FIG. 6.

The vertical assembly table 10 includes a pivotable subframe 32 associated with each roller table 26 and 28. Each subframe 32 includes a plurality of support arms 34 attached to a common pivot shaft 36. The support arms 34 are pivotably operable by air cylinders 38 which are best shown in FIGS. 4 and 5. The air cylinders 38 move each subframe 32 from a retracted position shown in FIGS. 2–5 to a transfer position shown in FIGS. 6 and 7. In the retracted position of the subframes 32 the support arms 34 are in a more horizontal orientation, with the support arms 34 positioned below a top surface of adjacent rolls 30 of the associated roller table 26 or 28 as shown in FIG. 3. In other words, support arms 34 are below the pass line in the retracted position. In the retracted position, the subframe 32 and associated structure does not interfere with the conveyance of the glass lite or the assembled window structures onto or off of the vertical assembly table 10. In the transfer position, the support arms 34 of each subframe 32 are positioned in a more vertical orientation and are used for transferring one glass lite to the adjacent support frame 32 for assembling the window structure, as will be described hereinafter.

Figure 13:
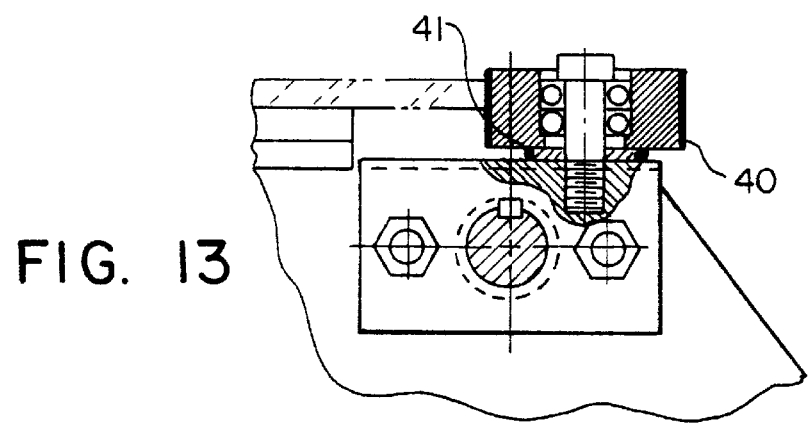
FIG. 13 is a cross-sectional view of an edge engaging roller with a drag clutch.

Each support frame 32 includes a plurality of edge engaging rollers 40, which are adapted to at least initially engage an edge of the glass lite which is parallel to the transportation direction of the roller tables 26 and 28. The edge engaging rollers 40, shown in detail in FIG. 13, are positioned adjacent the pivot shaft 36 at a position above the top surface of the support arms 34. When the subframes 32 are moved to the transfer position, the glass lite will be fed by gravity until the edge parallel to the transportion direction engages the with the edge engaging rollers 40. The edge engaging rollers 40 include an O-ring member 41 as shown in FIG. 13. The O-ring member 41 forms a drag clutch or friction member which will prevent over rolling of the aligned glass lites. The edge engaging rollers 40 also serve to at least initially align one edge of the glass lite during the assembly procedure.

Figure 9:
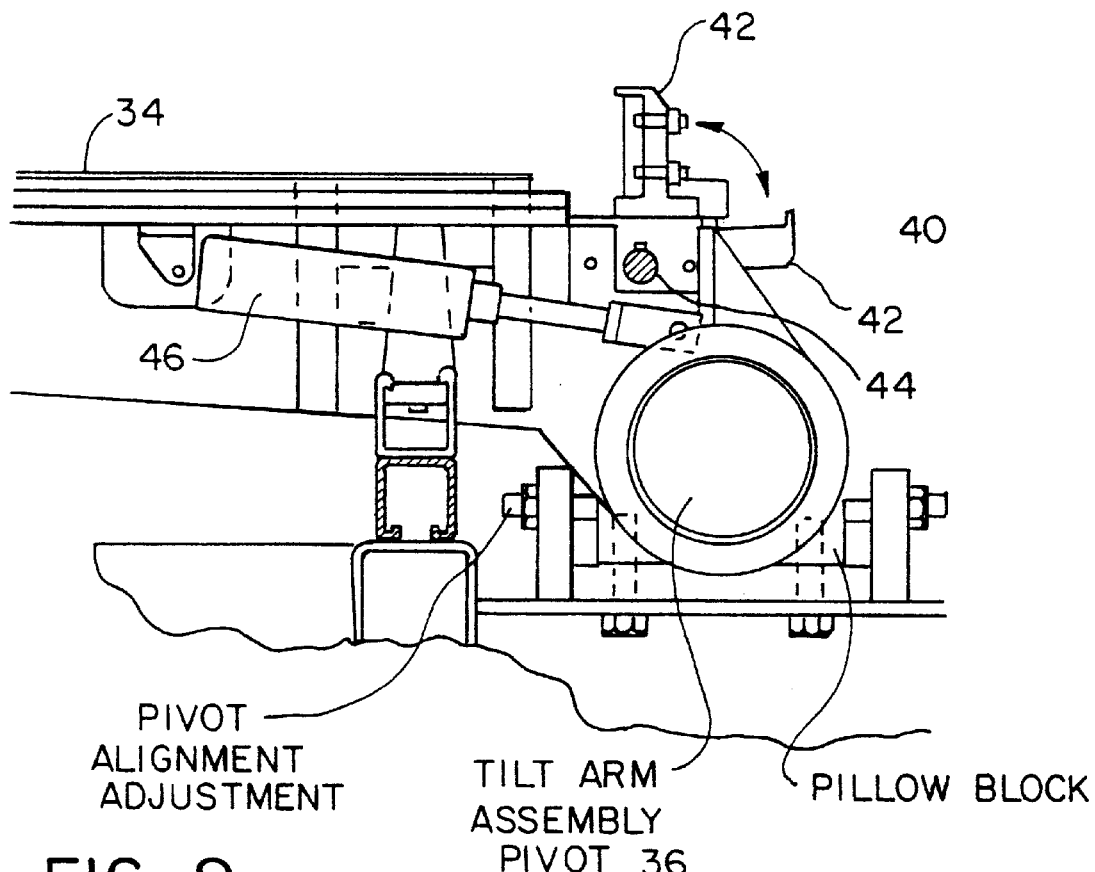
FIG. 9 is a side view of a pivotable alignment arm of the vertical assembly table of FIG. 1.
Figure 10:
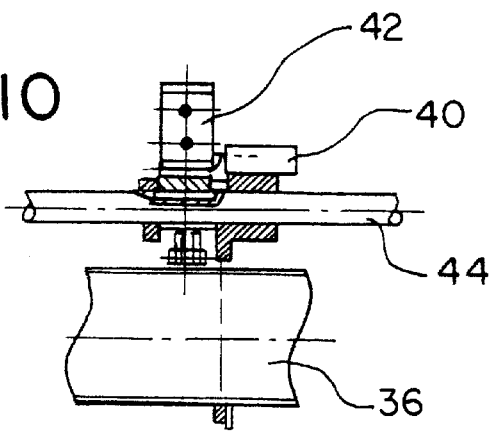
FIG. 10 is a sectional view of the alignment arm illustrated in FIG. 10.

The vertical assembly table 10 additionally includes a transfer mechanism for transferring one glass lite (preferably the glass lite not having a seal) from one subframe 32 to the other subframe 32 holding the other glass lite (preferably the glass lite with the seal) for assembling the window structure. The transfer occurs when the subframes 32 are in the transfer position. The transfer mechanism includes a plurality of abutment arms 42 mounted for selective engagement with the glass workpieces on one subframe 32. The abutment arms 42 are mounted on the subframe 32 positioned on the spacer lite side. The abutment arms 42 are movable on a common pivot shaft 44 by actuation cylinder 46. When the subframes 32 are positioned in the transfer position, the abutment arms 42 are adapted to be pivoted from a retracted, non-engaged position to an engaged position shown in FIG. 9 substantially perpendicular to the surface of the support arms 34. In the engaged position, the abutment arms 42 are above the engagement surface of the edge engaging rollers 40 of both subframes 32 such that both of the glass lites for each window structure will be simultaneously supported on the abutment arms 42. In this manner, the abutment arms 42 serve to align the edge of the glass lites extending in the direction parallel to the transporation direction.

Figure 11:
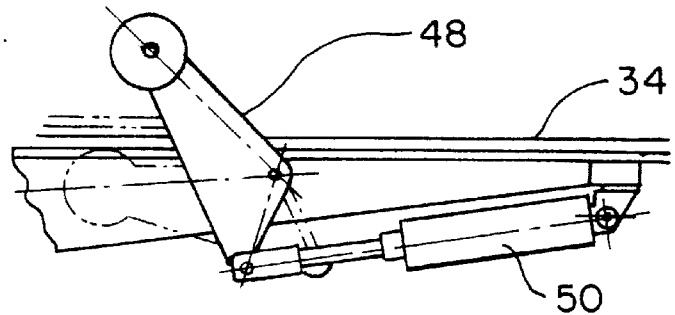
FIG. 11 illustrates the pushover arm of the subframe illustrated in FIG. 4.

The transfer mechanism additionally incorporates a glass lite pushover mechanism mounted on the subframe 32 on the non-spacer lite side that is on the roller table 28. The pushover mechanism, as shown in greater detail in FIG. 11, includes a pivoted engagement member 48 attached to support arms 34 of the subframe 32 associated with roller table 28. The engagement member 48 is operated by pneumatic cylinder 50. In operation, after the glass lites have been simultaneously supported on the abutment arms 42, the engagement members 48 can be actuated to push the non-spacer glass lite from one subframe 32 to the other associated subframe 32. This procedure essentially accomplishes the assembly of the window structure. Following this assembly, the subframes 32 can be moved to the retracted position with the now assembled window structure repositioned on roller table 26 for subsequent transfer to the exit conveyor 22.

Figure 8:
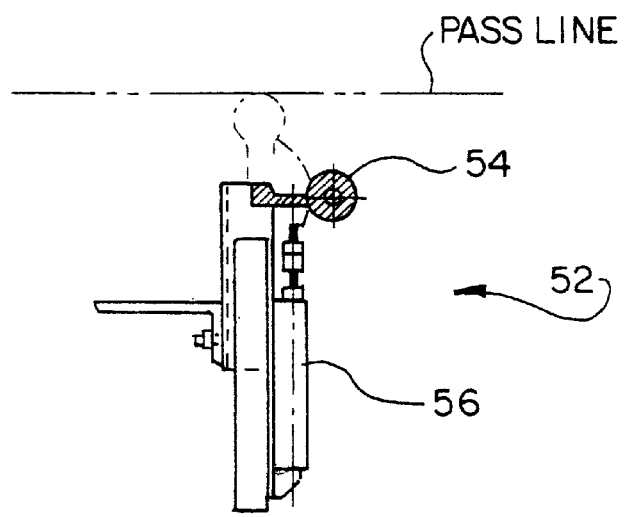
FIG. 8 is a sectional view of an alignment mechanism of the vertical table illustrated in FIG. 1.

The vertical assembly table 10 additionally incorporates an alignment mechanism 52 for aligning the edges of the glass lites which are perpendicular to the transporting direction. The details of the alignment mechanism 52 are shown in FIG. 8, with the alignment mechanism 52 including a pivotable abutment 54 operated by cylinder 56. In operation, after the subframes 32 are moved to the transfer position, the cylinder 56 is actuated to move the abutment 54 to engage the glass lites simultaneously to align the edges of the glass lite which are perpendicular to the transporting direction. As shown in FIG. 4, a pair of alignment mechanisms 52 are provided so that the vertical assembly table 10 can operate for assembling two window structures simultaneously.

Figure 12:
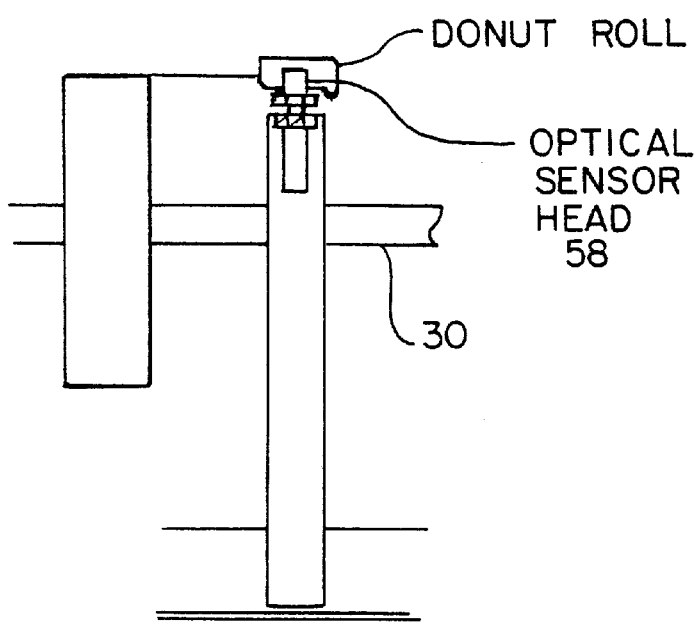
FIG. 12 illustrates a typical optical position sensor for the vertical assembly table illustrated in FIG. 1.

Sensors such as photoelectric sensors are utilized in the vertical assembly table 10 for proper positioning of the glass lite during the process. The optical position sensors are provided on the conveyor area, with the sensors comprising photoelectric type sensors, or heads, 58 which may be incorporated with selected rolls 30 as shown in FIG. 12 or even into the donut roll of selected rolls 30. The optical sensors 58 can be positioned in any roll 30, but preferably, at the leading rolls, the middle rolls and the end rolls of each roller table. The infrared, photoelectric type sensors are conventional and send out a pulsed infrared beam that detects a reflected beam from the target material. Sensitivity is set by distance and gain setting, as known in the art. The position of the subframes can be detected with inductive type proximity switches, which are not shown in detail.

A detailed description of the operation of the vertical assembly table 10 may help clarify the construction and components thereof. The following description is for a single window structure per cycle. The non-spacer glass lite will generally be positioned as follows. The non-spacer glass lite will typically be positioned at washer 12 in a manual operation by the operator with the edge placed within about 2 inches from a visual reference point. The non-spacer glass lite passes from the washer 12 through transfer conveyor 14 to conveyor 16 directly onto roller table 28 of the vertical assembly table 10. When the leading edge of the non-spacer glass lite trips a sensor 58 located near the end of the vertical assembly table 10, the drive motor (not shown) of the roller table 28 is slowed to creep mode. Subsequently, when the leading edge of the non-spacer glass lite trips a sensor 58 located at the end of the vertical assembly table 10, the drive motor of the roller table 28 is stopped accurately positioning the non-spacer glass lite. The spacer receiving glass lite is positioned in a similar fashion as follows. The spacer glass lite is manually positioned on the washer 12 in the same manner discussed above for the non-spacer glass lite. The spacer receiving glass lite is allowed to stop on the transfer conveyor 14 and then transferred to caster conveyor 18. At the caster conveyor 18, a spacer or seal is applied by the operator and the leading edge may be positioned at a reference point. After the spacer is applied, the glass lite is transferred from caster conveyor 18 through conveyor 20 and onto roller table 26 of the vertical assembly table 10. When the leading edge of the spacer glass lite trips a sensor 58 located near the end of the vertical assembly table 10, the drive motor (not shown) of the roller table 26 is slowed to creep mode and when at a sensor 58 located at the end of the vertical assembly table 10, the drive motor of the roller table 26 is stopped to initially position the spacer glass lite.

Following this initial positioning of the adjacent glass lites, the air cylinders 38 are activated to tilt the respective subframes 32 from the retracted to the transfer position. In the transfer position, the glass lites will slide against the respective bottom edge rollers 40. When the subframes 32 reach the fully raised position, both glass lites will have settled onto the edge rollers 40. At this point, the alignment mechanism 52 can be activated so that the abutment 54 engages the leading edge of both glass lites simultaneously to align the leading edges of the glass lites. The O-ring 41 drag clutch shown in FIG. 13 prevents coasting of either glass lite. Following the alignment of the leading edges of the glass lites, the abutment arms 42 are actuated by cylinder 46 to simultaneously engage both glass lites. The abutment arms 42 act as bottom edge squaring stops so that the edge of the glass lites extending parallel to the transportation direction will be exactly parallel. The abutment arms 42 also serve to support the glass lites on the same structure. Following engagement of the abutment arms 42 with both glass lites simultaneously, the engagement member 48 is activated by cylinder 50 to gently push the upper area of the non-spacer glass lite toward the spacer glass lite. This essentially completes the assembly of the window structure and the subframes 32 can be lowered to the retracted position depositing a now assembled glass window structure onto the roller table 26. The assembled structure can be fed to the exit conveyor 22 completing the process. It will be appreciated that additional sensors 58 are incorporated into the middle of the roller tables 26 and 28 such that the vertical assembly table 10 can be used to simultaneously assembly two window structures. A second alignment mechanism 52 is provided to accommodate the assembly of multiple window structure on the vertical assembly table 10.

Figure 14:
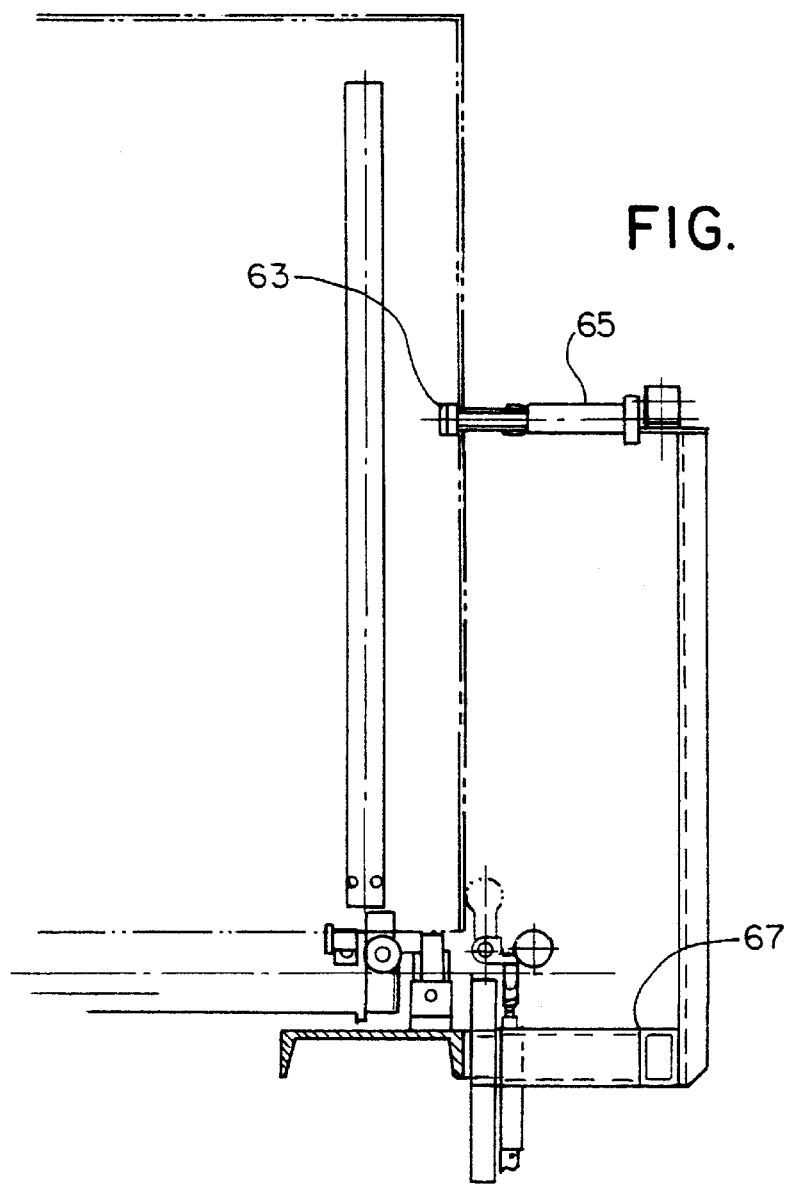
FIG. 14 is an elevational side view of portions of a modified subframe according to the present invention.

FIG. 14 illustrates a modification of the present invention by including a separator 63 movably positioned between larger glass lites. The separator 63 is movable by piston actuator 65 mounted on extension base 67. The separator 63 is needed to prevent larger glass lites from prematurely contacting each other. The separator 63 can be withdrawn to align the glass lites by the piston actuator 65.

The above description is intended to be illustrative of the present invention and not restrictive thereof. Consequently, it will be apparent to those of ordinary skill in the art that various changes may be made to the present invention without departing from the spirit and scope thereof. The scope of the present invention is intended to be defined by the appended claims and equivalents thereto.

I claim:

1. A vertical assembly table for assembling glass window structures comprising:

a pair of adjacent roller tables, each roller table having a plurality of spaced rolls and each roller table adapted to receive at least one glass workpiece thereon;

a pair of pivotable subframes, each subframe associated with one rotatable roller table and having a plurality of support arms coupled to a common pivot shaft, each support arm positioned between rolls of the associated roller table, wherein each subframe is movable between a retracted position below the top surface of the rolls of the associated roller table and a transfer position adjacent the other subframe in the transfer position; and a transfer mechanism for transferring a glass workpiece from one subframe to the adjacent subframe when the subframes are in the transfer position.

2. The vertical assembly table of claim 1, further including at least one alignment mechanism for positioning the leading edge of the glass workpiece which extends substantially perpendicular to a transporting direction.

3. The vertical assembly table of claim 2, wherein the alignment mechanism includes a pivotable abutment surface adapted to move between a non-engaged position and an engaged alignment position adapted to engage a leading edge of glass workpieces on both subframes simultaneously.

4. The vertical assembly table of claim 2, including a pair of alignment mechanisms spaced along a longitudinal axis of the vertical assembly table, wherein the vertical assembly table is adapted for simultaneously assembling a plurality of the glass workpiece window structures.

5. The vertical assembly table of claim 1, further including a plurality of edge rollers on each subframe adapted to initially engage an edge of each glass workpiece which extends substantially parallel to a transporting direction of the associated roller table.

6. The vertical assembly table of claim 5, wherein the transfer mechanism includes a pivotable abutment arm on one subframe adapted to be moved to an engaged position supporting and aligning an edge of the glass workpieces on both subframes simultaneously.

7. The vertical assembly table of claim 6, wherein the transfer mechanism includes an engagement member adapted to selectively engage and pivot one glass workpiece from one subframe to the other subframe.

8. The vertical assembly table of claim 1, further including a plurality of position sensors.

9. The vertical assembly table of claim 8, wherein the position sensors are incorporated into a plurality of spaced rolls along each roller table.

* * * * *